May 21, 1968 — T. E. BAN — 3,384,355
HEAT SHIELDS FOR A TRAVELING GRATE MACHINE
Filed July 11, 1966
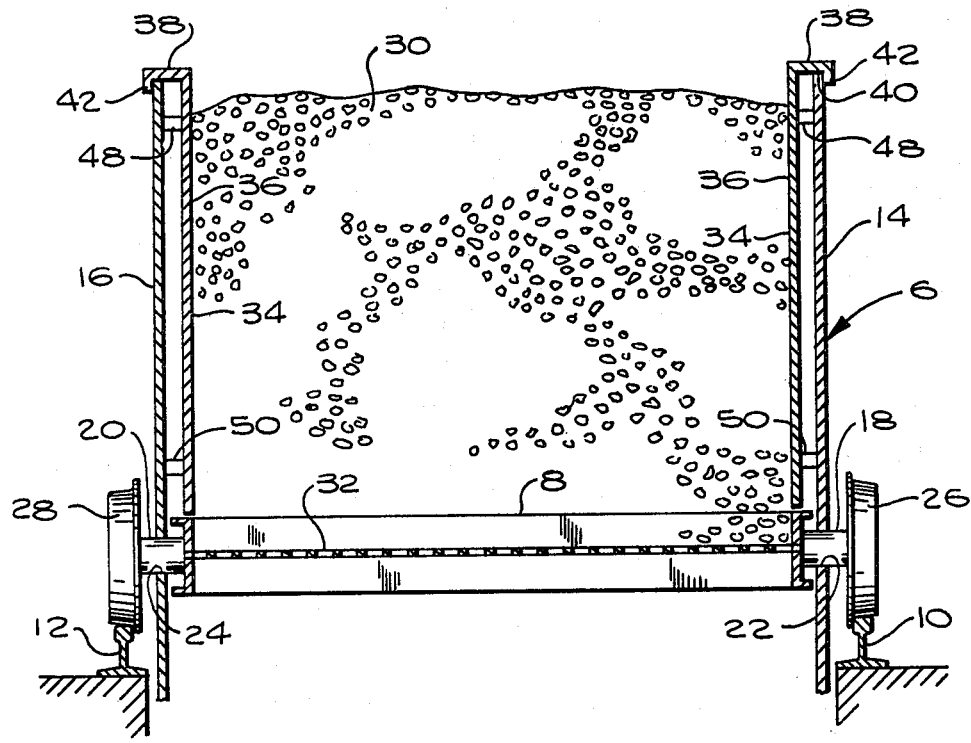
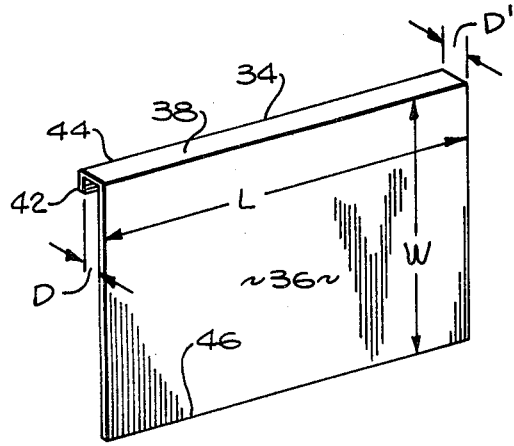
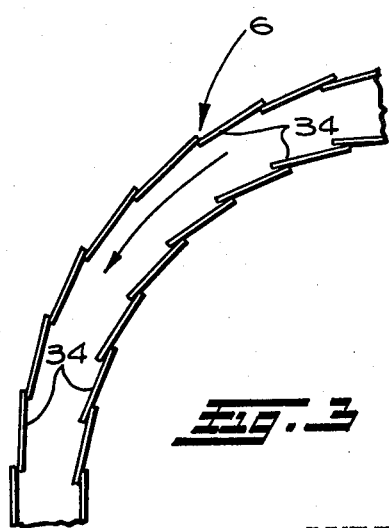
INVENTOR
THOMAS E. BAN
BY Kramer & Sturges
ATTORNEYS United States Patent Office 3,384,355
Patented May 21, 1968

3,384,355
HEAT SHIELDS FOR A TRAVELING
GRATE MACHINE
Thomas E. Ban, Cleveland Heights, Ohio, assignor to Mc-
Dowell-Wellman Engineering Co., a corporation of
Ohio
Filed July 11, 1966, Ser. No. 564,395
7 Claims. (Cl. 263—28)

ABSTRACT OF THE DISCLOSURE

There are provided in a traveling grate machine, means for protecting the sidewalls from heat which comprise a plurality of shields each including a rectangular plate supported over the top of the adjacent sidewall of the moving pallets.

---

The invention relates generally to traveling grate machines and more particularly to devices used for protecting the sidewalls of the machine from heat given off during processing of material carried by the machines.

One of the biggest problems in processing bulk material such as coal or oil-bearing shale, is the actual handling of the material. The traveling grate machine, especially the circular type, is especially well suited for handling bulk material, and for this reason is being used more and more in carrying out the processing of such material.

A circular traveling grate machine essentially comprises a plurality of pallets which are movable along a circular trackway. The pallets have grates which are tiltable so that material charged to the grates can be dumped. A hood and windbox are normally used with the machine and are mounted, respectively, above and below the traveling pallets.

In a typical process, material is charged to the grates of the pallets in one section of the circular machine. The pallets carry the material to another section where, for example, hot gases are passed downwardly through the material on the pallets from the hood into the windbox. The pallets then move to another section of the machine where the processed material is removed from the grates. The dumped pallets continue on to receive a new charge of material. Thus, material charged to the circular traveling grate machine is continuously being processed.

The circular traveling grate machine is known for being able to handle large quantities of material. In some processes, the burden is charged to a height of from four to eight feet on pallets which may be six to twelve feet wide. In such cases, the sidewalls of the machine must be at least as high to accommodate the burden. Most processes are carried on under extreme heat which distorts or warps the sidewalls of the machine. When a sidewall of the machine becomes damaged, the operation of the machine must be completely shut down for a long period of time in order to replace the damaged sidewall. This is very costly and substantially reduces the amount of material that can be processed by the machine.

Briefly stated, this invention is directed to protecting the sidewalls of the machine by providing heat shields which are mounted on the sidewalls, and which absorb a substantial portion of the heat given off during the processing of the material on the pallets. The heat shields are composed of heat-resistant material such as steel, and are preferably mounted in spaced relation from the sidewalls, leaving a space or gap between the sidewall and heat shield. This space acts to further insulate the sidewalls from the heat given off during the process.

The following description of the invention will be better understood by having reference to the annexed drawing wherein:

FIG. 1 is a fragmentary cross-sectional view of a circular traveling grate machine showing a typical pallet and sidewalls of the machine;

FIG. 2 is a perspective view of a typical heat shield of this invention; and

FIG. 3 is a fragmentary top view of a circular traveling grate machine showing how the heat shields are hung in overlapped relation along the sidewalls, the arrow denoting the direction in which the pallets travel.

Referring to FIGS. 1–3 of the drawing, there is shown a traveling grate machine generally indicated at 6. The aforementioned hood and windbox and any means for sealing the spaces therebetween are not shown in the drawing, as these components are well known in the art, and are not an essential part of the invention.

The circular machine 6 comprises a plurality of pallets, e.g. pallet 8, which move along a circular trackway composed of rails 10 and 12 which are usually mounted adjacent the windbox.

The circular machine 6 has a pair of parallel circular sidewalls 14 and 16 between which the pallet 8 rides. The pallet 8 is mounted on a pair of axles 18 and 20 which extend through openings 22 and 24, respectively, in the sidewalls 14 and 16. A pair of wheels 26 and 28 are mounted on the ends of the pallet axles 22 and 24, respectively, and ride along the trackway rails 10 and 12. Thus, as the pallets are moved along the trackway they carry the machine's sidewalls 14 and 16, that is, the sidewalls move with the pallets.

A burden, e.g. coal or oil-bearing shale 30, charged on the grate 32 of the pallet 8, would normally rest against the machine sidewalls 14 and 16.

Most processes involve heat which tends to distort or warp the sidewalls 14 and 16. This is especially true when the sidewalls are designed to accommodate a burden depth of from four to eight feet. Maintenance of the traveling grate machine would be extremely expensive and difficult in such cases, as the sidewalls would need to be periodically replaced or repaired.

A plurality of heat shields, e.g. shield 34, are provided to protect the sidewalls 14 and 16. The heat shield 34 can be made of any suitable heat resistant material such as steel, or in some cases refractory can be used as an insulating material. The heat shields 34 are relatively inexpensive to manufacture, and are designed to hang freely on the sidewalls rather than be rigidly mounted on the sidewalls. In this way, the shields 34 are free to expand, contract, warp and corrode. The operation of the circular machine 6 is not seriously affected when the heat shields warp, etc., for as soon as an individual heat shield is ruined, it can be easily replaced.

The heat shields 34 are preferably hung on the sidewalls 14 and 16 in overlapped rather than abutting end-to-end relation, and are carried by the sidewalls as they move with the pallets. The shield 34 is provided with a plate 36 which extends from the top of the sidewall substantially to the top of the pallets. In other words, the plate 36 is designed such that the burden 30 on the pallets will rest entirely against the heat shields 34. The plate 36 is normally made of steel although in some cases it could be made of refractory material.

A leg 38 is secured to, and extends from the plate 36. The leg 38 is preferably disposed at a right angle to the plate 36, and is designed to rest on top of the sidewall, e.g. leg 38 rests on the top marginal edge 40 of sidewall 14.

A stop or abutment 42 is provided on the leg 38 to form a hook for engaging the top 40 of the sidewall 14. The abutment 42 is formed by reversely bending the free marginal edge 44 of the leg 38 back towards the free marginal edge 46 of the side plate 36.

A plurality of spaced lugs or projections, e.g. projections 48 and 50, are provided to keep the plate 36 in spaced relation from the adjacent sidewall. The projections 48 and 50 are preferably disposed adjacent the upper and lower marginal edges of the plate 36 and may be formed in either the plate 36 or the sidewalls 14 and 16 of the machine 6. The space or gap formed between the plate 36 and adjacent sidewall helps to insulate the sidewall from the heated material or hot gases given off during the process.

The length L and width W of the heat shield 34 are variable depending on the corresponding width of the sidewalls, as it is essential to provide a heat shield which is easily handled.

As previously indicated, the heat shields are placed in overlapping end-to-end relation as shown in FIG. 3. To facilitate overlapping, the distance D between the stop 42 and the plate 36 at each end of the heat shield can be varied. For example, the distance D at one end of the heat shield can be designed to accommodate the overall width D' of the leg 38 at the other end of the heat shield. The heat shields when overlapped, would then lie flat against each other and be less apt to tilt or turn.

The heat shields not only act to protect the sidewalls of the machine from thermal expansion by minimizing the temperatures to which the sidewalls are exposed, but also act to conserve heat by minimizing the radiation of the heat through the sidewalls. Thus, the process can be carried on with greater efficiency and less loss of heat due to absorption and radiation.

Thus, there has been provided a new and novel device for protecting the sidewalls of a traveling grate machine from the thermal effects of heat given off during the course of processes carried on within the machine.

What is claimed is:

1. In a traveling grate machine having spaced sidewalls and moving pallets therebetween, means for protecting the sidewalls from the thermal effects of heat given off during the processing of material carried by the pallets comprising in combination, a plurality of shields mounted on each sidewall, each shield comprising in combination:
    (a) a rectangular plate dimensioned to extend from the top of the adjacent sidewall substantially to the top of the pallets;
    (b) a leg extending from the plate for resting on the top marginal edge of the adjacent sidewall, the leg keeping the bottom marginal edge of the plate from touching the pallets; and
    (c) a stop disposed on the leg in spaced relation from the plate and coacting with the plate to limit lateral movement of the top marginal edge of the plate relative to the sidewall.

2. The sidewall protecting means of claim 1, which includes means coacting with the plate for holding the plate in spaced relation from the adjacent sidewall.

3. The sidewall protecting means of claim 2 wherein the holding means includes projections disposed between the plate and adjacent sidewall.

4. The sidewall protecting means of claim 3 wherein the heat shields are heat resistant.

5. The sidewall of claim 3, wherein the heat shields are composed of steel.

6. The sidewall protecting means of claim 5, wherein the plate of each heat shield is composed of refractory material.

7. The sidewall protecting means of claim 5, wherein the heat shields are mounted in end-to-end partially overlapping relation on the sidewalls.

References Cited
UNITED STATES PATENTS

| | | | |
|---|---|---|---|
| 1,763,624 | 6/1930 | Larsson | 263—28 |
| 2,463,633 | 3/1949 | Longenecker | 263—1 |
| 2,672,412 | 3/1954 | Burrow et al. | 263—28 X |
| 2,821,469 | 1/1958 | Davis | 263—28 X |

FREDERICK L. MATTESON, Jr, *Primary Examiner.*

JOHN J. CAMBY, *Examiner.*